(12) United States Patent
Eckardt (10) Patent No.: US 7,026,783 B2
(45) Date of Patent: Apr. 11, 2006

(54) DRIVE SYSTEM (75) Inventor: Dieter Eckardt, Herzogenaurach (DE)

(73) Assignee: Siemens Aktiengesellschaft, Müchen (DE)

( * ) Notice: Subject to any disclaimer, the term of this patent is extended or adjusted under 35 U.S.C. 154(b) by 0 days.

(21) Appl. No.: 10/999,372

(22) Filed: Nov. 30, 2004

(65) Prior Publication Data
US 2005/0122082 A1   Jun. 9, 2005

(30) Foreign Application Priority Data
Dec. 3, 2003 (DE) ................ 103 56 515

(51) Int. Cl.
H02P 5/40 (2006.01)

(52) U.S. Cl. .............. 318/800; 318/712; 318/719; 318/254; 123/192.1; 307/64; 701/19

(58) Field of Classification Search ........... 318/254, 318/245, 139, 800, 712, 719, 802–813; 123/192.1; 363/65, 132; 307/18, 64, 66; 320/109; 701/19; 105/34.2, 26.05
See application file for complete search history.

(56) References Cited

U.S. PATENT DOCUMENTS

| 4,611,267 | A | * | 9/1986 | McMurray | ........... 363/58 |
|---|---|---|---|---|---|
| 5,376,828 | A | * | 12/1994 | Kim et al. | ........... 307/64 |
| 5,418,707 | A | * | 5/1995 | Shimer et al. | ........... 363/65 |
| 5,514,915 | A | * | 5/1996 | Kim et al. | ........... 307/64 |
| 5,546,742 | A | * | 8/1996 | Shekhawat et al. | ........... 60/788 |
| 5,559,402 | A | * | 9/1996 | Corrigan, III | ........... 315/169.3 |
| 5,698,905 | A | * | 12/1997 | Ruthlein et al. | ........... 290/32 |
| 6,023,137 | A | * | 2/2000 | Kumar et al. | ........... 318/254 |
| 6,109,229 | A | * | 8/2000 | Pels | ........... 123/179.6 |
| 6,109,237 | A | * | 8/2000 | Pels et al. | ........... 123/339.19 |
| 6,148,784 | A | * | 11/2000 | Masberg et al. | ........... 123/192.1 |
| 6,158,405 | A | * | 12/2000 | Masberg et al. | ........... 123/192.1 |
| 6,177,734 | B1 | * | 1/2001 | Masberg et al. | ........... 290/31 |
| 6,199,650 | B1 | * | 3/2001 | Masberg et al. | ........... 180/197 |
| 6,202,776 | B1 | * | 3/2001 | Masberg et al. | ........... 180/65.2 |
| 6,392,856 | B1 | * | 5/2002 | Kehrli et al. | ........... 361/64 |

(Continued)

FOREIGN PATENT DOCUMENTS

DE           35 39 027 A1      5/1987

(Continued)

Primary Examiner—Paul Ip
(74) Attorney, Agent, or Firm—Henry M. Feiereisen (57) ABSTRACT A drive system includes a central power supply with a line-commutated converter and a DC/DC converter connected downstream of the line-commutated converter, and a plurality of inverters, each inverter having an output connected a load, for example a motor, and a DC input connected to a regulated DC voltage output of the central power supply. Buffer capacitors are connected across the respective input and output of the DC/DC converter. The drive system further includes an energy recovery device with an input connected to the controlled voltage output of the central power supply and an output connected to at least two input terminals of the line-commutated converter. This type of drive system eliminates a bulky brake circuit.

19 Claims, 6 Drawing Sheets

U.S. PATENT DOCUMENTS

| | | | |
|---|---|---|---|
| 6,405,701 B1 * | 6/2002 | Masberg et al. | 123/192.1 |
| 6,487,998 B1 * | 12/2002 | Masberg et al. | 123/192.1 |
| 6,512,351 B1 * | 1/2003 | Uematsu et al. | 320/166 |
| 6,591,758 B1 * | 7/2003 | Kumar | 105/35 |
| 6,612,245 B1 * | 9/2003 | Kumar et al. | 105/26.05 |
| 6,612,246 B1 * | 9/2003 | Kumar | 105/34.2 |
| 6,615,118 B1 * | 9/2003 | Kumar | 701/19 |
| 6,906,434 B1 * | 6/2005 | Koeppe et al. | 307/64 |
| 6,919,648 B1 * | 7/2005 | Bolz et al. | 290/40 C |
| 2002/0093310 A1 * | 7/2002 | Uematsu et al. | 320/109 |
| 2002/0105231 A1 * | 8/2002 | Koeppe et al. | 307/64 |
| 2002/0177929 A1 * | 11/2002 | Kumar | 701/19 |
| 2003/0222502 A1 * | 12/2003 | Takahashi et al. | 307/18 |
| 2003/0228503 A1 * | 12/2003 | Georgii | 429/13 |
| 2004/0112320 A1 * | 6/2004 | Bolz et al. | 123/179.28 |
| 2004/0141347 A1 * | 7/2004 | Naito et al. | 363/132 |

FOREIGN PATENT DOCUMENTS

| | | |
|---|---|---|
| DE | 199 13 634 C2 | 9/2000 |
| JP | 10-193405 | 7/1998 |

* cited by examiner

DRIVE SYSTEM

CROSS-REFERENCES TO RELATED APPLICATIONS

This application claims the priority of German Patent Application, Serial No. 103 56 515.9, filed Dec. 3, 2003, pursuant to 35 U.S.C. 119(a)–(d).

BACKGROUND OF THE INVENTION

The present invention relates to a drive system for electric motors, and more particularly to a drive system that allows energy recovery from a plurality of electric motors during a braking operation.

Nothing in the following discussion of the state of the art is to be construed as an admission of prior art.

Figure 1:
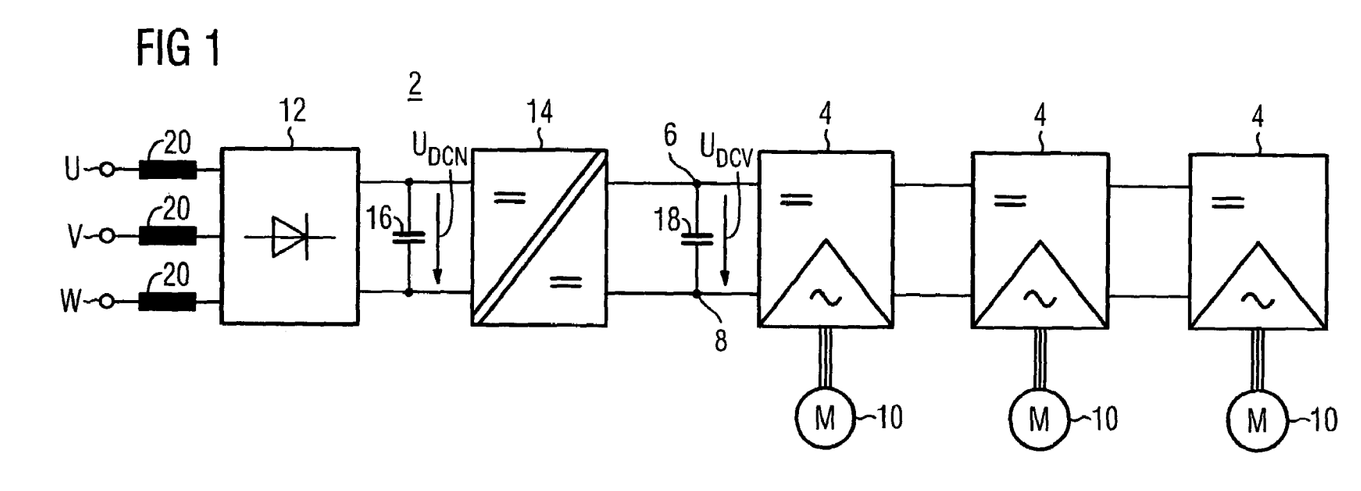
FIG. 1 shows a circuit diagram of a prior art drive system.

A drive system of this type is illustrated in FIG. 1 and includes a central power supply 2 having a line-commutated converter 12 and a DC/DC converter 14, as well as a plurality of inverters 4. A DC-input of each of the inverters 4 is connected to an output of the DC/DC converter 14, whereas the respective AC outputs of the inverters 4 are connected to corresponding multi-phase electric motors 10. The input of the line-commutated converter 12 is connected via chokes 20 to terminals U, V, and W of a three-phase power line (not shown). The output of the line-commutated converter 12 is connected to the input of the DC/DC converter 14, with a first buffer capacitor 16 connected across the input of the DC/DC converter 14 and second buffer capacitor 18 connected across the output of the DC/DC converter 14. From the phase voltages $U_U$, $U_V$, and $U_W$ of the power line, the line-commutated converter 12 generates a DC voltage $U_{DCN}$ which is applied across the first buffer capacitor 16. The DC/DC converter 14 generates from the DC voltage $U_{DCN}$ a specified regulated DC voltage $U_{DCV}$, also referred to as supply voltage, which is applied across the second buffer capacitor 18.

It may be necessary to brake inverter-powered motors 10 by converting mechanical energy into electrical energy which is then transferred to the second buffer capacitor 18. Because the braking process requires that all motors 10 switch to generator mode at the same time, no load is available to use the recovered energy. Moreover, the recovered energy cannot be returned to the power line, because a line-commutated rectifier 12 operating as a converter is arranged on the power line side the central power supply 2. Even if the line-side converter 12 were able to recover energy, the recovered energy could not be returned to the power line, because the DC/DC converter 14 on the output side of the central power supply 2 can transmit energy in only one direction. The supply voltage $U_{DCV}$ across the second buffer capacitor 18 must therefore be prevented from exceeding or even reaching a predetermined limit value, in which case the drive system would need to shut down for safety reasons.

Figure 2:
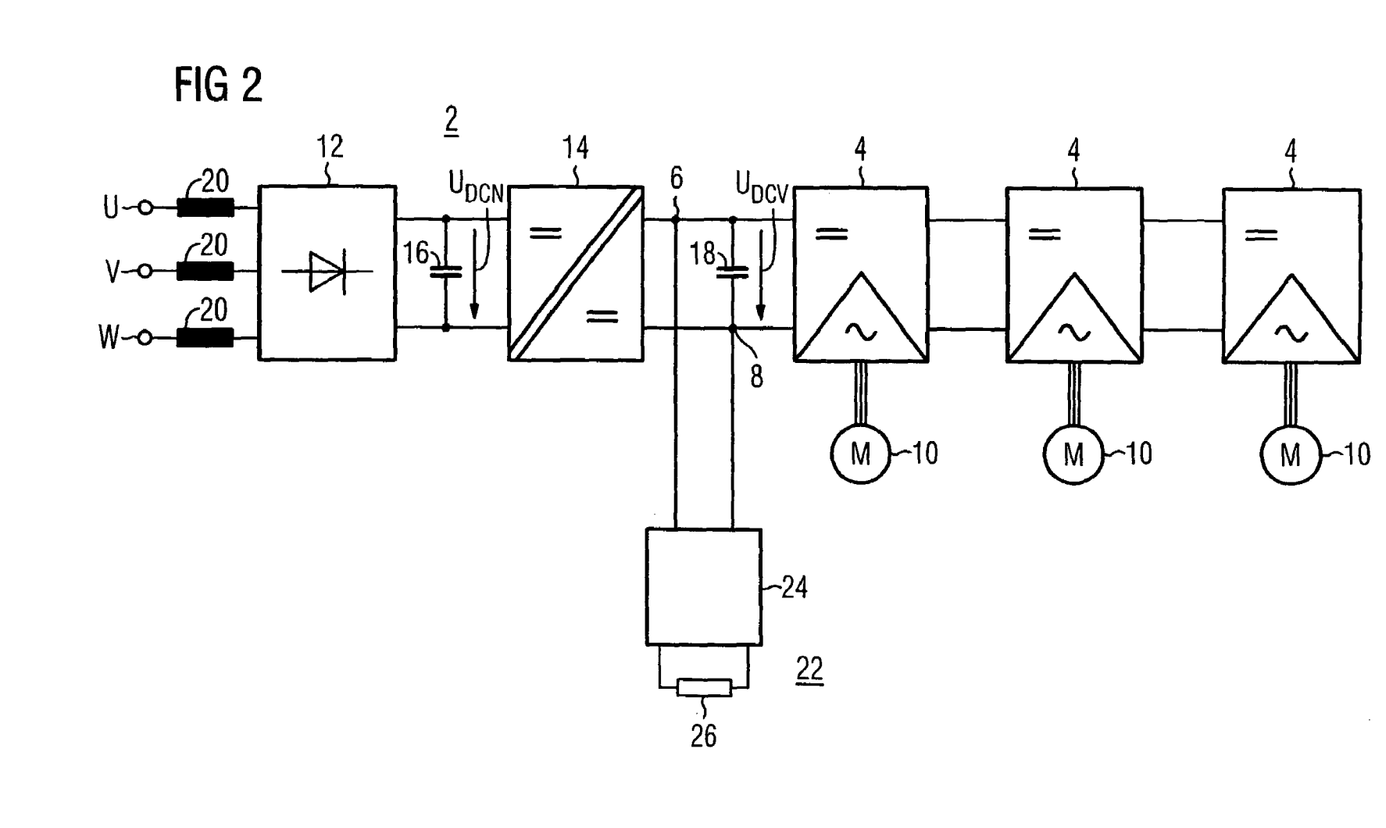
FIG. 2 shows the drive system of FIG. 1 with an additional brake circuit.

FIG. 2 shows in more detail a brake circuit 22 which is intended to prevent an overvoltage across the capacitor 18 and hence also an emergency shut down of the drive system. The brake circuit 22 includes a brake controller 24, also referred to as a brake chopper, and a brake resistor 26. The brake chopper 24 is connected in parallel with the terminals 6 and 8 of the regulated DC voltage output of the central power supply 2. The brake circuit 22 maintains the supply voltage $U_{DCV}$ across the capacitor 18 at a predetermined voltage level and converts the energy received from the motors 10 into ohmic losses (heat) in the brake resistor 26 which needs to be sized accordingly and may also have to be cooled. In addition, the brake resistor 26 may require a considerable amount of space.

In prior art transport systems the transport paths are configured by combining separate transport modules. Each transport module includes several rollers, at least one roller drive and a corresponding inverter that powers a motor. The transport modules are compact and only need to be assembled, i.e., mechanically and electrically connected which each other, for example by connecting the DC inputs of the inverters in parallel and then with the DC terminals of the central power supply 2, which can be located centrally with respect to the transport system or with respect to a section of the transport system. A fast braking action is required when positioning the transported items with the shortest possible cycle times and optionally handing the transported items over to other transport paths, whereby the mechanical energy is returned as electrical energy to the capacitor 18 connected across the output terminals of the central power supply. Typically, the speed of all drives must be reduced simultaneously, i.e., all drives switch simultaneously to generator mode. As mentioned above, the output of the central power supply is provided with a brake circuit to prevent an emergency shutdown of the drive system of the transport system for safety reasons. The central power supply 2 can be arranged in the center of the transport system or of a section of the transport system.

This type of drive system for a transport system generates from an AC line voltage of, for example, 380 V a DC voltage $U_{DCN}$ of, for example, 540 V, to which an AC-component with six times the line frequency is superimposed. Because the inverters 4 for the motors 10 require a supply voltage $U_{DCV}$ of, for example, 48 V, the central power supply 2 includes a DC/DC converter 14 that produces from the DC voltage $U_{DCN}$ the desired regulated supply voltage $U_{DCV}$ of, for example, 48 V. This voltage is low enough so as not to require special cable selection or special cable routing.

It would therefore be desirable and advantageous to provide a drive system, which obviates prior art shortcomings and enables energy recovery from a load without the need for a brake circuit.

SUMMARY OF THE INVENTION

According to one aspect of the present invention, a drive system includes a central power supply with a line-commutated converter and a DC/DC converter connected downstream of the line-commutated converter, and a plurality of inverters, each inverter having an output connected a load, for example a motor, and a DC input connected to a regulated DC voltage output of the central power supply. A first buffer capacitor is connected across an input of the DC/DC converter, and a second buffer capacitor is connected across an output of the DC/DC converter supplying a controlled DC voltage. The drive system further includes an energy recovery device with an input connected to the controlled voltage output of the DC/DC converter and an output connected to at least two input terminals of the line-commutated converter.

The energy recovery device returns energy from the buffer capacitor at the output-side of the central power supply to the power line and regulates the voltage at the buffer capacitor to a predetermined value. The energy recovery device eliminates the conventional brake circuit, which is not only less expensive and saves space, but also significantly improves the overall efficiency of the drive system.

According to an advantageous feature of the drive system, the energy recovery device can include a second DC/DC converter and a line-commutated bidirectional converter, whereby an input of the second DC/DC converter can be connected to the input terminals of the energy recovery device and a DC output of the second DC/DC converter can be connected to the DC-side of the line-commutated bidirectional converter. With this embodiment, energy can be returned to the power line even if the regulated DC voltage at the output-side capacitor of the central power supply is lower than an equivalent DC value of the line voltage of the power line. The DC/DC converter generates from the regulated output DC voltage of the central power supply a DC voltage with an amplitude that is greater than the equivalent DC value of the power line voltage, allowing current to flow from the line-commutated bidirectional converter back into the power line. The drive system of the invention can be used with a modular transport system.

According to another advantageous feature of the drive system, the second DC/DC converter can include an auxiliary power supply, which can be used to supply power to a controller of the line-commutated bidirectional converter. The auxiliary power supply can include an auxiliary winding of the DC/DC converter and a diode connected downstream of the auxiliary winding. This arrangement also makes the energy recovery device less expensive, because the controller of the line-commutated bidirectional converter no longer requires an external power supply.

Advantageous embodiments of the invention may include one or several of the following features. The line-commutated bidirectional converter can be configured for two-phase or three-phase line power. The second DC/DC converter can be a flyback converter or a flux converter.

The line-commutated bidirectional converter may be configured as a line-commutated rectifier with a plurality of diodes and a plurality of electronically controllable switches, for example Insulated Gate Bipolar Transistors (IGBT), connected in parallel with the diodes in one-to-one correspondence. Control inputs of the electronically controllable switches can be connected with corresponding control outputs of the controller. A separate capacitor can be connected between each of the AC terminals of the line-commutated rectifier.

According to another aspect of the invention, a drive system for a motor includes a central power supply with a line-commutated bidirectional rectifier and a DC/DC converter connected downstream of the line-commutated bidirectional rectifier, and a plurality of inverters, with each inverter having an output connected a load and a DC input connected to a regulated DC voltage output of the central power supply. A first buffer capacitor is connected across an input of the DC/DC converter and a second buffer capacitor is connected across an output of the DC/DC converter, supplying a controlled DC voltage. The drive system further includes an energy recovery device with an input connected to the controlled voltage output of the central power supply and an output connected to the DC output of the line-commutated bidirectional rectifier of the central power supply.

This arrangement with a line-commutated bidirectional rectifier significantly reduces the complexity of the energy recovery device and its electrical connection with the drive system, because only the DC/DC converter in the central power supply, which is not capable of energy recovery, has to be bridged for returning energy from the various loads (motors) to the power line. The DC/DC converter can convert the voltage applied to the output-side capacitor into a DC voltage with an amplitude that exceeds the equivalent DC value of the power line voltage by a predetermined value. Energy can then be returned to the power line even if the regulated DC voltage at the output-side capacitor of the central power supply is smaller than an equivalent DC value of the power line voltage. In this way, a current can flow from the capacitor across the output of the central power supply through the line-commutated bidirectional rectifier to the power line. This drive system of the invention is also suitable for use with a modular transport system. The DC/DC converter can be a flyback converter or a flux converter.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

This is one of two applications both filed on the same day. Both applications deal with related inventions. They are commonly owned but have different inventive entity. Both applications are unique, but incorporate the other by reference. Accordingly, the following U.S. patent application is hereby expressly incorporated by reference: "POWER SUPPLY SYSTEM".

Figure 3:
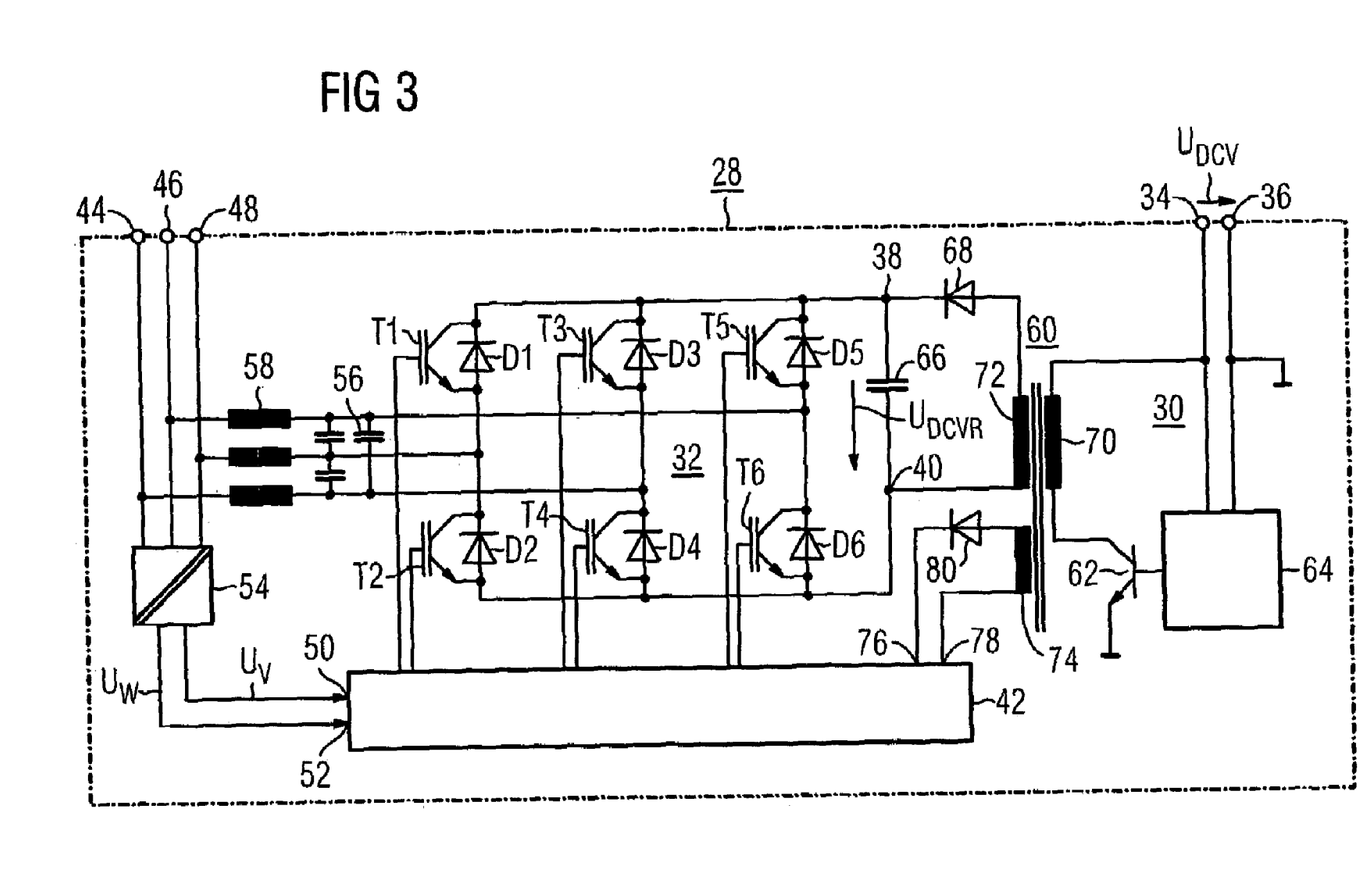
FIG. 3 shows a circuit diagram of a first variation of an energy recovery device according to the invention.

Turning now to the drawing, and in particular to FIG. 3, there is shown a first embodiment of an energy recovery device 28 according to the invention, which has as an input a DC/DC converter 30 and as an output a line-commutated bidirectional rectifier 32, with an output of the DC/DC converter 30 being connected to the DC input side of the bidirectional rectifier 32. The DC supply voltage $U_{DCV}$ of the inverters 4 is applied to the input terminals 34 and 36 of the energy recovery device 28, whereas a voltage $U_{DCVR}$, which is also referred to as energy recovery voltage and has an amplitude that is greater than an equivalent DC value of the line voltage of a supply grid, is applied to the output terminals 38 and 40 of the DC/DC converter 30. Since the line-commutated bidirectional rectifier 32 of the energy recovery device 28 conducts current in both directions, the voltage drop between the energy recovery voltage $U_{DCVR}$ and the DC-equivalent value of the line voltage can cause current to flow through the rectifier at 32 into the power line.

In the depicted embodiment, the line-commutated bidirectional rectifier 32 is configured as a three-phase rectifier with three bridge arms, each bridge arm having two diodes D1, D2; D3, D4; and D5, D6, respectively, connected in series. To enable a line-commutated rectifier to conduct current in both directions, electronically controllable switches T1 to T6 are connected in parallel with the diodes D1 to D6 in one-to-one correspondence and controlled synchronously with the phase voltages of the corresponding diodes D1 to D6. The phase voltages are defined by the natural commutation points, for example by an intersection between two line voltages. To control the electronically controllable switches T1 to T6, for example Insulated Gate Bipolar Transistors, synchronously with the phase voltages of the corresponding diodes D1 to D6, the control inputs of the switches are connected to a controller 42, with at least two phase voltages $U_V$ and $U_W$ applied to the input of the controller 42. A potential isolation device 54, for example an opto-coupler, is arranged between the output terminals 44, 46 and 48 of the energy recovery device 28 and the input terminals 50 and 52 of the controller 42. Capacitors 56 are connected in a star topology to the output of the line-commutated bidirectional rectifier 32. In addition, a line choke 58 is connected with a corresponding output terminal 44, 46 and 48 of the energy recovery device 28. An example of a line-commutated bidirectional rectifier 32 is described in German patent publication no. DE 35 39 027 A1, to which reference is made herewith, and an example of a controller 42 is disclosed in German patent publication no. DE 199 13 634 C2, to which reference is made herewith.

The DC/DC converter 30 in the embodiment of FIG. 3 is a flyback converter and includes a voltage transformer 60, an electronically controllable switch 62, a switching regulator 64, a buffer capacitor 66 and a diode 68. The electronically controllable switch 62, for example a transistor, is connected in series with the primary winding 17 of the voltage transformer 60, with the control input of the transistor connected to the switching regulator 64. The buffer capacitor 66 is connected across the series connection formed of the diode 68 and the secondary winding 72 of the voltage converter 60. Pulses are applied to the switch 62 to generate from the input-side voltage $U_{DCV}$ an energy recovery voltage $U_{DCVR}$ across the buffer capacitor 66. The DC-side of the line-commutated bidirectional rectifier 32 is connected electrically in parallel with the buffer capacitor 66. The switching regulator 64 is activated as soon as the input-side supply voltage $U_{DCV}$ exceeds a predetermined limit, so that the DC/DC converter 30 is pulsed only when considered necessary.

In the embodiment of the energy recovery device 28 illustrated in FIG. 3, the voltage transformer 60 of the flyback converter includes an auxiliary winding 74, with the output of the auxiliary winding 74 connected to power supply terminals 76 and 78 of the controller 42. A diode 80 connected between the auxiliary winding 74 and the power supply terminal 76 restricts current flow to only one direction. The controller 42 receives electric power from the auxiliary power supply by always applying pulses to the electronically controllable switch 62 to some degree and not only when considered necessary, whereby, for example, the pulse characteristic can be adjusted by changing a pulse width ratio (duty cycle) or by changing the pulse frequency while maintaining a constant pulse width.

With the energy recovery device 28 according to the invention, energy recovered from the inverter-powered motors 10 can be readily returned to a supply line of the drive system, which not only increases the efficiency of the drive system, but is also less expensive than prior art drive systems that employ a brake circuit. In addition, the energy recovery device 28 of the invention requires significantly less installation space that a conventional brake circuit 22.

Figure 4:
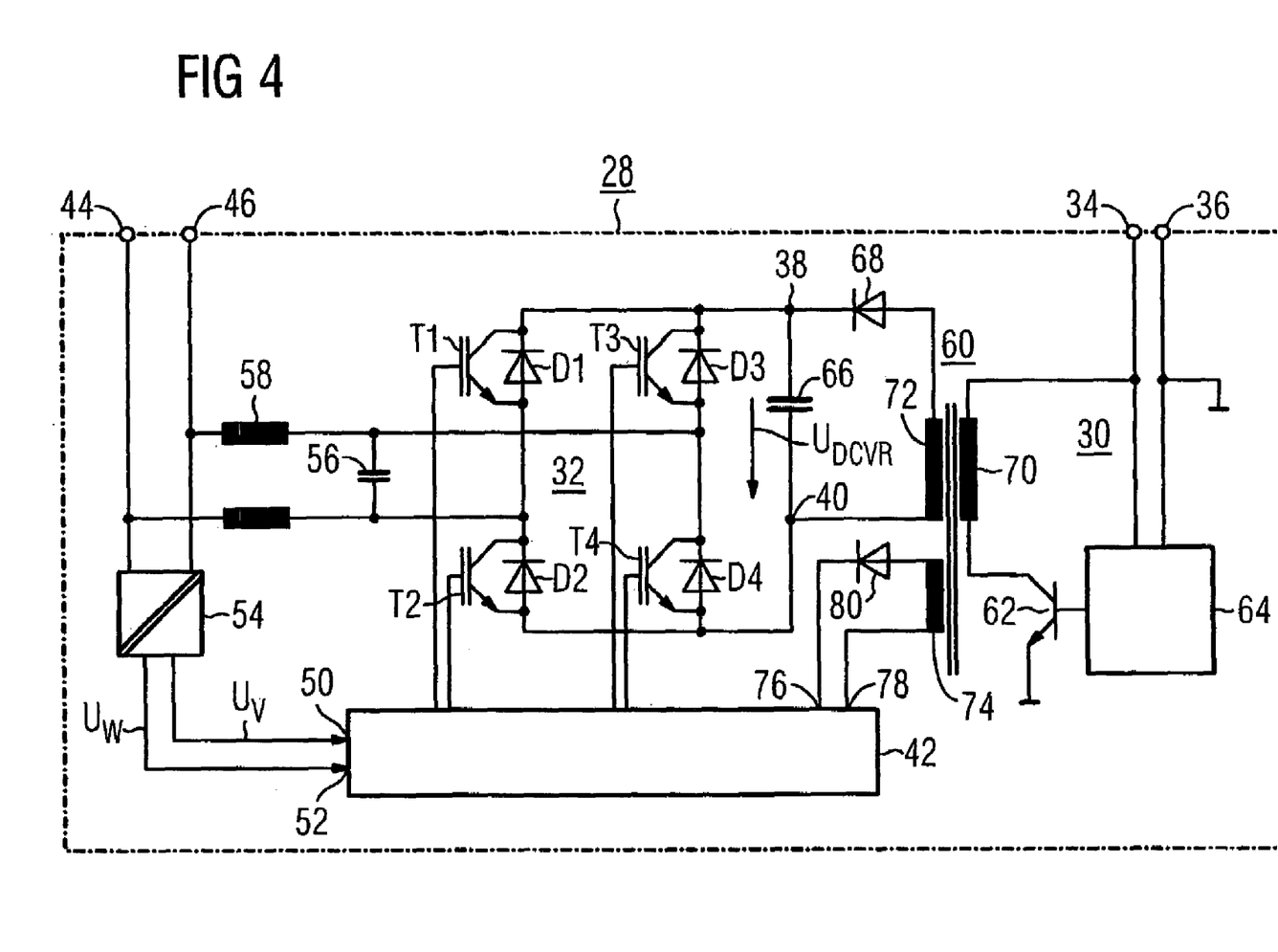
FIG. 4 shows a circuit diagram of a second variation of an energy recovery device according to the invention.

FIG. 4 shows a second embodiment of the energy recovery device 28 of the invention wherein, unlike in the first embodiment of FIG. 3, the line-commutated bidirectional rectifier 32 is connected to a two-phase power line and is therefore implemented as an H-bridge. Due to the two-phase configuration of this rectifier 32, the respective electronically controllable switches T1 to T4 are turned on only for a time close to the peak of the line voltage, to prevent the output-side capacitor 56 from being constantly charged and discharged. The capacitive current can be adjusted during operation by changing of the turn-on time of the switches T1 to T4, thereby finding a middle ground between the recovered energy and the generated capacitive reactive power. In all other aspects, the operation of the flyback converter is identical to that of the energy recovery device 28 of FIG. 3.

Figure 5:
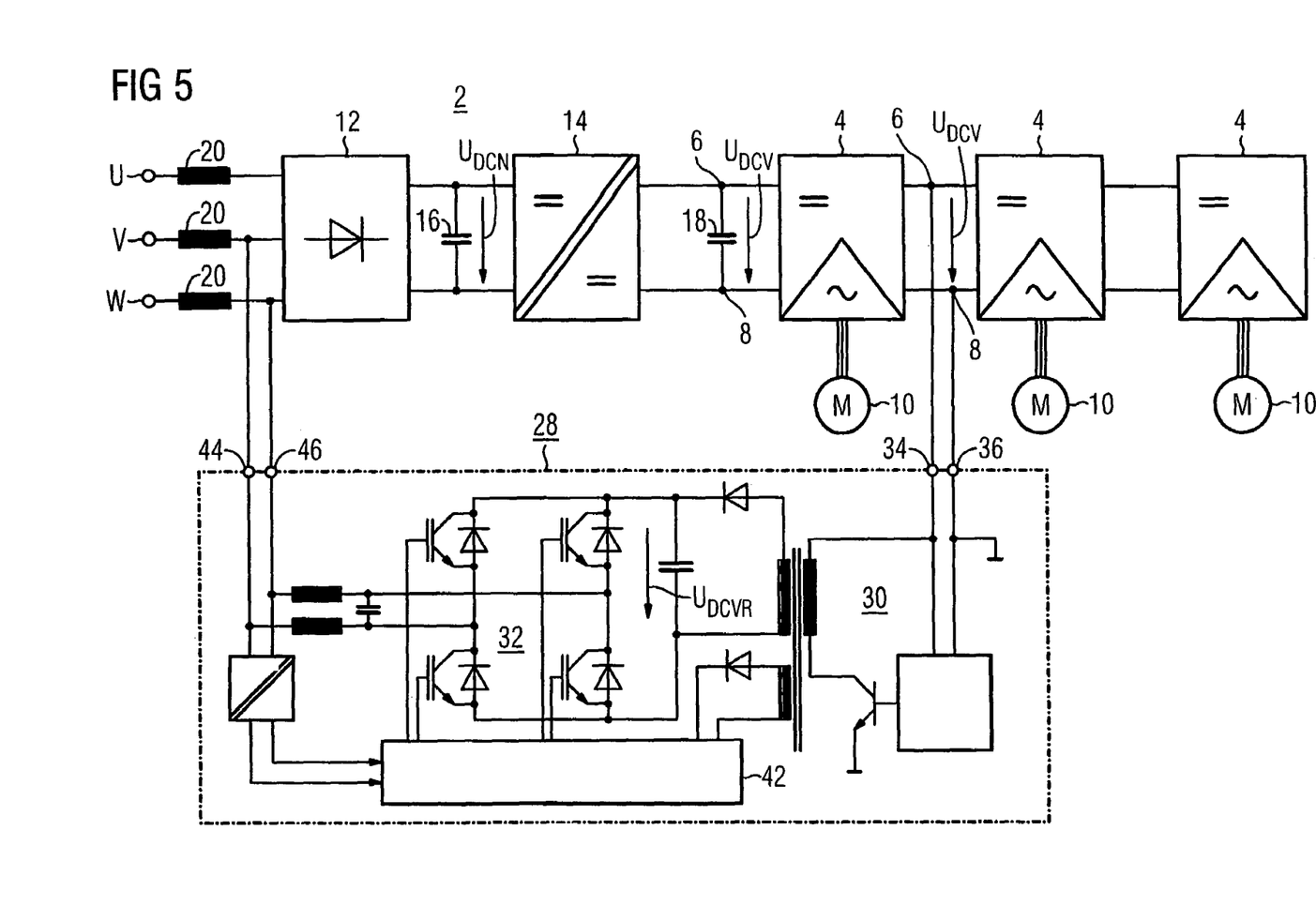
FIG. 5 shows a circuit diagram of a first embodiment of a drive system according to the invention.

FIG. 5 shows a first embodiment of a drive system according to the invention, which includes the drive system of FIG. 1 and the energy recovery device 28 of the invention, as depicted in FIG. 4. The input terminals 34, 36 of the energy recovery device 28 are connected to the output terminals 6 and 8 of the central power supply 2 of the drive system. The output terminals 44, 46 of the energy recovery device 28 are connected with respective inputs of the line-commutated rectifier 12. If all inverter-powered motors 10 switch to generator mode during operation, then mechanical energy is returned to the output-side capacitor 18 in form of electrical energy. This causes an increase in the supply voltage $U_{DCV}$. When the amplitude of the supply voltage $U_{DCV}$ increases above a predetermined value, the timing pulses applied to the DC/DC converter 30 are changed to generate from the supply voltage $U_{DCV}$ an energy recovery voltage $U_{DCVR}$ with an amplitude that is greater than the equivalent DC value of the line voltage, so that a current can flow through the rectifier 32 into the power line of the drive system. The energy recovery device 28 of the invention obviates the need for a brake circuit 32, which saves space, reduces costs, and also significantly improves the overall efficiency of the drive system, since the energy recovery circuit 28 is less expensive than a brake circuit 22.

Figure 6:
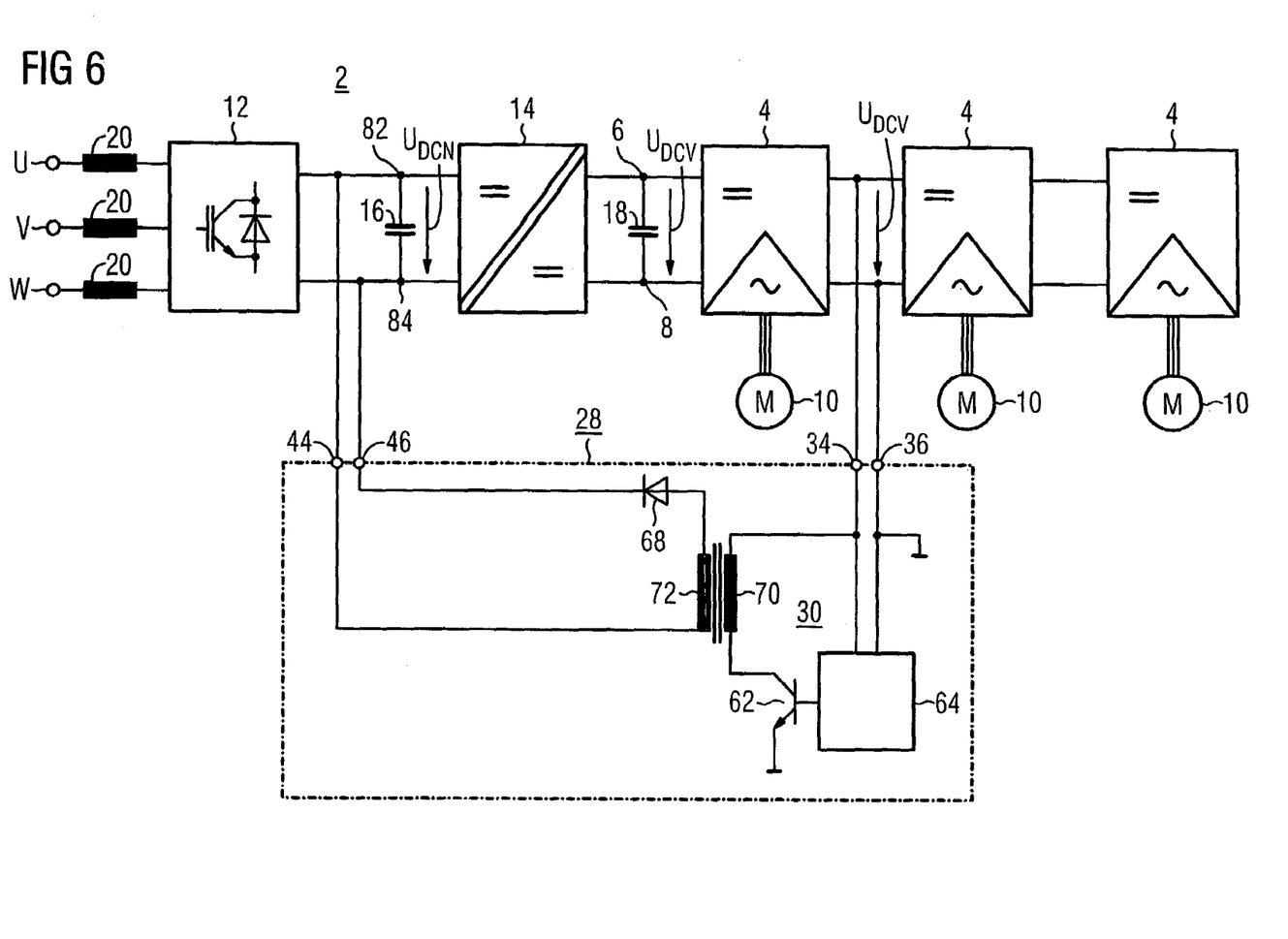
FIG. 6 shows a circuit diagram of a second embodiment of a drive system according to the invention.

FIG. 6 shows a second embodiment of a drive system of the invention, whereby the line-commutated converter 12 is configured for bidirectional current flow. As schematically shown in FIG. 6, electronically controllable switches are connected electrically in parallel with each diode of this converter, with the switches switched to a conducting state only during the conducting phases of the diodes, thereby allowing bidirectional current flow. This embodiment of the bidirectional rectifier 12 therefore corresponds to the line-commutated bidirectional rectifier 32 of the energy recovery device 28 of FIG. 3. Because the line-side converter 12 of the central power supply 2 of the drive system is then always capable of energy recovery, the converter 32 shown in FIG. 3 can be omitted from the energy recovery device 28, so that only the DC/DC converter 30 remains in this embodiment of the energy recovery device 28. Moreover, the output of this embodiment of the energy recovery device 28 is also no longer connected to the input terminals of the line-commutated converter 12 of the central power supply 2, but instead to the terminals 82 and 84 of the buffer capacitor 16.

Because the output of the energy recovery device 28 is now connected in parallel with the buffer capacitor 16, the output-side buffer capacitor 66 of the DC/DC converter 30 can also be eliminated.

The operation of the DC/DC converter 30 is independent of the design of the converter, so that a flux converter can be used instead of the flyback converter shown in FIGS. 3 to 6. The DC/DC converter 30 operates by allowing the energy recovery voltage $U_{DCVR}$ generated from the supply voltage $U_{DCV}$ at the output-side capacitor 18 of the central policy supply 2 to exceed the equivalent DC value of the line voltage of the supply line by a predetermined value. Only then can a current flow through the line-commutated bidirectional rectifier 12 and 32, respectively, into the power line of the drive system.

Replacing the prior art brake circuit 22 with the energy recovery device 28 of the invention significantly improves the overall efficiency of the drive system and reduces its cost. A drive system of this type can be advantageously employed in modern transport and conveyor systems.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A drive system for driving a load, comprising:
   a central power supply having a line-commutated converter and a DC/DC converter connected downstream of the line-commutated converter;
   a plurality of inverters, each inverter having an output connected the load and a DC input connected to a regulated DC voltage output of the central power supply;
   a first buffer capacitor connected across an input of the DC/DC converter and a second buffer capacitor connected across an output of the DC/DC converter supplying a controlled DC voltage;
   an energy recovery device having an input connected to the controlled voltage output of the DC/DC converter and an output connected to at least two input terminals of the line-commutated converter.

2. The drive system of claim 1, wherein the energy recovery device comprises a second DC/DC converter and a line-commutated bidirectional converter, with an input of the second DC/DC converter being connected to the input terminals of the energy recovery device and a DC output of the second DC/DC converter being connected to the DC-side of the line-commutated bidirectional converter.

3. The drive system of claim 2, wherein the line-commutated bidirectional converter is configured for three phases.

4. The drive system of claim 2, wherein the line-commutated bidirectional converter is configured for two phases.

5. The drive system of claim 1, wherein the second DC/DC converter comprises an auxiliary power supply.

6. The drive system of claim 5, wherein the line-commutated bidirectional converter of the energy recovery device includes a controller that is connected to the auxiliary power supply and also, at a separate potential, to the input of the energy recovery device.

7. The drive system of claim 6, wherein the line-commutated bidirectional converter is configured as a line-commutated rectifier with a plurality of diodes and a plurality of electronically controllable switches connected in parallel with the diodes in one-to-one correspondence, wherein control inputs of the electronically controllable switches are connected with corresponding control outputs of the controller, and wherein a separate capacitor is connected between each of the AC terminals of the line-commutated rectifier.

8. The drive system of claim 7, wherein the electronically controllable switches are implemented as Insulated Gate Bipolar Transistors (IGBT).

9. The drive system of claim 5, wherein the auxiliary power supply comprises an auxiliary winding of the DC/DC converter and a diode connected downstream of the auxiliary winding.

10. The drive system of claim 1, wherein the second DC/DC converter is a flyback converter.

11. The drive system of claim 1, wherein second DC/DC converter is a flux converter.

12. The drive system of claim 1, wherein the load comprises an electric motor.

13. A transport system comprising a drive system of claim 1.

14. A drive system for a load, comprising:
    a central power supply having a line-commutated bidirectional rectifier and a DC/DC converter connected downstream of the line-commutated bidirectional rectifier;
    a plurality of inverters, each inverter having an output connected to the load and a DC input connected to a regulated DC voltage output of the central power supply;
    a first buffer capacitor connected across an input of the DC/DC converter and a second buffer capacitor connected across an output of the DC/DC converter supplying a controlled DC voltage;
    an energy recovery device having an input connected to the controlled voltage output of the central power supply and an output connected to the DC output of the line-commutated bidirectional rectifier of the central power supply.

15. The drive system of claim 14, wherein the energy recovery device comprises a DC/DC converter.

16. The drive system of claim 15, wherein the DC/DC converter is a flyback converter.

17. The drive system of claim 15, wherein the DC/DC converter is a flux converter.

18. The drive system of claim 14, wherein the load comprises an electric motor.

19. A transport system comprising a drive system of claim 14.

* * * * *